(12) United States Patent
Chiu et al.

(10) Patent No.: US 7,696,706 B2
(45) Date of Patent: Apr. 13, 2010

(54) FAN SYSTEM AND REAL-TIME STOPPING DEVICE THEREOF

(75) Inventors: Chin-Fa Chiu, Taoyuan Hsien (TW);
Chun-Lung Chiu, Taoyuan Hsien (TW);
Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/638,559

(22) Filed: Dec. 14, 2006

(65) Prior Publication Data
US 2007/0145923 A1 Jun. 28, 2007

(30) Foreign Application Priority Data
Dec. 23, 2005 (TW) ............................ 94145979 A

(51) Int. Cl.
*H02P 3/12* (2006.01)
(52) U.S. Cl. .................. 318/375; 318/379; 318/381
(58) Field of Classification Search ............... 318/375, 318/362, 275, 563, 379, 381; 417/423.8, 417/423.1, 410.1
See application file for complete search history.

(56) References Cited
U.S. PATENT DOCUMENTS

| 4,169,990 | A | * | 10/1979 | Lerdman | 318/400.41 |
|---|---|---|---|---|---|
| 4,319,171 | A | * | 3/1982 | Motoori | 318/379 |
| 4,477,751 | A | * | 10/1984 | Kanayama | 318/280 |
| 4,544,869 | A | * | 10/1985 | Pittaway | 318/293 |
| 4,734,627 | A | * | 3/1988 | Koerner | 318/400.21 |
| 6,175,204 | B1 | * | 1/2001 | Calamatas | 318/375 |
| 6,316,892 | B1 | * | 11/2001 | Valencia | 318/293 |
| 6,320,409 | B1 | * | 11/2001 | Nakajima et al. | 326/36 |
| 6,494,681 | B2 | * | 12/2002 | Barry et al. | 416/175 |
| 6,551,065 | B2 | * | 4/2003 | Lee | 417/32 |
| 6,758,788 | B2 | * | 7/2004 | Itou | 477/8 |
| 6,812,586 | B2 | * | 11/2004 | Wacknov et al. | 290/52 |
| 7,446,492 | B2 | * | 11/2008 | Wei et al. | 318/275 |
| 2004/0022638 | A1 | * | 2/2004 | Strupp | 417/2 |

* cited by examiner

*Primary Examiner*—Bentsu Ro
*Assistant Examiner*—David S Luo
(74) *Attorney, Agent, or Firm*—Birch, Stewart, Kolasch & Birch, LLP

(57) ABSTRACT

A fan system includes a stator magnetic pole, a driving unit and a real-time stopping unit. The driving unit is coupled with the stator magnetic pole and controls a polarity change of the stator magnetic pole in accordance with a driving signal. The real-time stopping unit is electrically connected with the driving unit. When the fan system is powered off, the driving unit enables two ends of the stator magnetic pole to have the same voltage level in accordance with a control signal generated by the real-time stopping unit so that the fan system stops operating immediately.

17 Claims, 2 Drawing Sheets

FAN SYSTEM AND REAL-TIME STOPPING DEVICE THEREOF

CROSS REFERENCE TO RELATED APPLICATIONS

This Non-provisional application claims priority under 35 U.S.C. §119(a) on Patent Application No(s). 094145979 filed in Taiwan, Republic of China on Dec. 23, 2005, the entire contents of which are hereby incorporated by reference.

BACKGROUND OF THE INVENTION

1. Field of Invention

The invention relates to a fan system and a device thereof, and, in particular, to a fan system capable of immediately stopping operating when the fan system is powered off, and a real-time stopping device of the fan system.

2. Related Art

Because the performance and the processing speed of the electronic device are increased, the integration of the used electrical elements is greatly increased, and the heat dissipating requirement is also increased. A fan may be disposed in the electronic device to dissipate the heat. A convention fan control device can properly fix or adjust the rotating speed of the fan at or to a speed between the full speed and the low speed in accordance with the environment temperature of the fan. However, after the electronic device is powered off, the fan cannot stop completely until a period of time of inertial rotation is elapsed.

However, when the fan is making its inertial rotation, the user may unintentionally touch the fan and get hurt. Thus, he or she has to wait for the fan to stop rotating completely and then starts to maintain the fan. So, it is time-wasting and decreases the working efficiency.

Therefore, it is an important subject of the invention to provide a fan system capable of stopping operating immediately after the fan system is powered off, and a real-time stopping device thereof.

SUMMARY OF THE INVENTION

In view of the foregoing, the invention is to provide a fan system capable of stopping operating immediately after the fan system is powered off, and a real-time stopping device thereof. Thus, it is possible to prevent the user from unintentionally touching the fan system and getting hurt after the system is powered off, and the waiting time for maintenance can be saved, the circuit architecture can be simplified, the power can be saved, and the working efficiency can be enhanced.

To achieve the above, the invention discloses a fan system including a stator magnetic pole, a driving unit and a real-time stopping unit. The driving unit is coupled with the stator magnetic pole and controls a polarity change of the stator magnetic pole in accordance with a driving signal. The real-time stopping unit is electrically connected with the driving unit. When the fan system is powered off, the driving unit enables two ends of the stator magnetic pole to have the same voltage level in accordance with a control signal generated by the real-time stopping unit so that the fan system stops operating immediately.

To achieve the above, the invention also discloses a real-time stopping device of a fan system. The fan system has a stator magnetic pole and a driving unit, which is coupled with the stator magnetic pole and controls a polarity change of the stator magnetic pole in accordance with a driving signal. The real-time stopping device includes a real-time stopping unit electrically connected with the driving unit. When the fan system is powered off, the driving unit enables two ends of the stator magnetic pole to have the same voltage level in accordance with a control signal generated by the real-time stopping unit so that the fan system stops operating immediately.

As mentioned above, the fan system and the real-time stopping device thereof in accordance with the invention control the operation of the fan system using the first switch element and the second switch element and enables the two ends of the stator magnetic pole to have the same voltage level to stop the fan system immediately by discharging the energy storage when the fan system is powered off. Compared with the prior art, the invention controls the simple circuit including the first switch element and the second switch element and enables the energy storage to generate a minor voltage in order to stop the fan system immediately and prevent the user from being hurt when he or she unintentionally touches the fan system, which is powered off. Thus, the waiting time of maintenance can be shortened, the circuit architecture can be simplified, the power can be saved, and the working efficiency can be enhanced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

13 The present invention will be apparent from the following detailed description, which proceeds with reference to the accompanying drawings, wherein the same references relate to the same elements.

Figure 1:
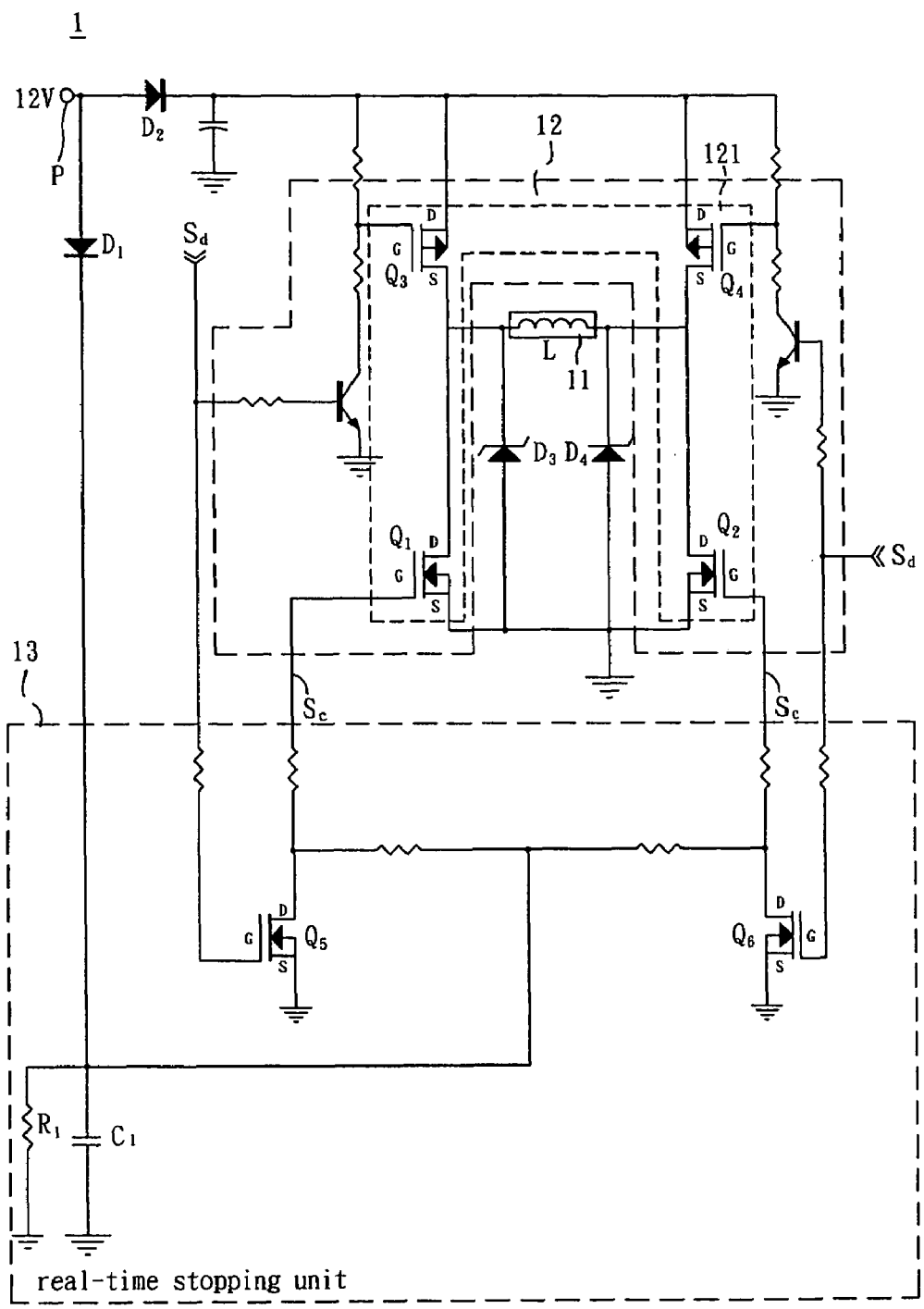
FIG. 1 is a schematic illustration showing a fan system including a full-bridge circuit in accordance with a preferred embodiment of the invention.

Referring to FIG. 1, a fan system 1 in accordance with a preferred embodiment of the invention includes a stator magnetic pole 11, a driving unit 12 and a real-time stopping unit 13. The fan system 1 of this embodiment is not particularly restricted and may be an axial-flow fan system or a centrifugal fan system.

Figure 2:
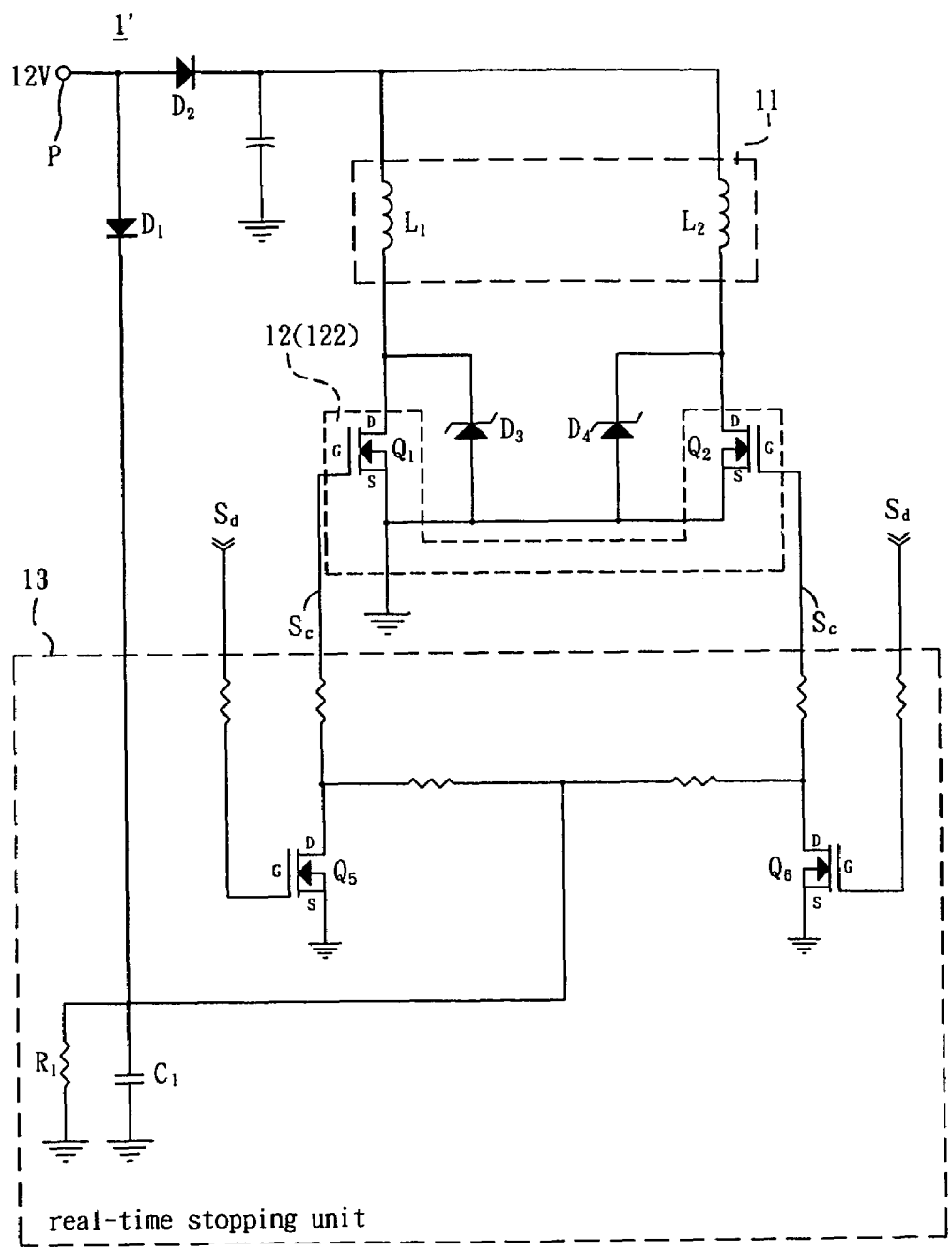
FIG. 2 is a schematic illustration showing another fan system including a half-bridge circuit in accordance with the preferred embodiment of the invention.

In this embodiment, the stator magnetic pole 11 has at least one coil L, the driving unit 12 is coupled with the stator magnetic pole 11, and the driving unit 12 includes a bridge circuit, which may be a full-bridge circuit 121 (see FIG. 1) or a half-bridge circuit 122 (see FIG. 2). When the bridge circuit is the full-bridge circuit 121, the full-bridge circuit 121 has a lower bridge element composed of a first transistor $Q_1$ and a second transistor $Q_2$, an upper bridge element composed of a third transistor $Q_3$ and a fourth transistor $Q_4$. In an example, each of the first transistor $Q_1$ and the second transistor $Q_2$ is an NMOS transistor, and each of the third transistor $Q_3$ and the fourth transistor $Q_4$ is a PMOS transistor. In addition, as shown in FIG. 2, when the bridge circuit of another fan system 1' is the half-bridge circuit 122, the half-bridge circuit 122 has a first transistor $Q_1$ and a second transistor $Q_2$, each of which is an NMOS transistor in the example.

The real-time stopping unit 13 includes a first switch element $Q_5$ and a second switch element $Q_6$, and is electrically connected with the driving unit 12. Each of the first switch element $Q_5$ and the second switch element $Q_6$ may be a transistor, which is an NMOS transistor in this example. In addition, the real-time stopping unit 13 further includes an energy storage $C_1$ and a resistor $R_1$. The energy storage $C_1$ is electrically connected with the resistor $R_1$ in parallel and is electrically connected with the first switch element $Q_5$ and the second switch element $Q_6$. The energy storage $C_1$ may be a capacitor including, without limitation to, a capacitor having a small capacitance, and the resistor $R_1$ enables the energy storage $C_1$ to discharge rapidly.

Each of the fan systems 1 and 1' may further include a first diode $D_1$, a second diode $D_2$, a first Zener diode $D_3$ and a second Zener diode $D_4$. One end of the first diode $D_1$ is electrically connected with the second diode $D_2$, and the other end of the first diode $D_1$ is electrically connected with the energy storage $C_1$. When the driving unit 12 includes the full-bridge circuit 121 (see FIG. 1), the first Zener diode $D_3$ and the second Zener diode $D_4$ is respectively connected with two ends of the stator magnetic pole 11, the first transistor $Q_1$ and the second transistor $Q_2$. When the driving unit 12 includes the half-bridge circuit 122 (see FIG. 2), one end of the first Zener diode $D_3$ is electrically connected with a first coil $L_1$ and a drain D of the first transistor $Q_1$, the other end of the first Zener diode $D_3$ is electrically connected with a source S of the first transistor $Q_1$ and a source S of the second transistor $Q_2$, one end of the second Zener diode $D_4$ is electrically connected with a second coil $L_2$ and a drain D of the second transistor $Q_2$, and the other end of the second Zener diode $D_4$ is electrically connected with the source S of the first transistor $Q_1$ and the source S of the second transistor $Q_2$. In this embodiment, the first diode $D_1$ and the second diode $D_2$ can prevent the reverse current phenomenon caused after the fan system 1 or 1' is powered off, and the first Zener diode $D_3$ and the second Zener diode $D_4$ function to eliminate the counter-electromotive force.

As shown in FIG. 1, the fan system 1 operates as follows when the driving unit 12 includes the full-bridge circuit 121. The driving unit 12 controls the first switch element $Q_5$ and the second switch element $Q_6$ of the real-time stopping unit 13 to turn on or off in accordance with a driving signal $S_d$ provided from the outside. Thus, each of the first switch element $Q_5$ the second switch element $Q_6$ generates a control signal $S_c$ to make the first transistor $Q_1$, the second transistor $Q_2$, the third transistor $Q_3$ and the fourth transistor $Q_4$ switch alternately. The driving signal $S_d$ includes two driving signals having two opposite phases. Thus, when the first switch element $Q_5$ is on and the second switch element $Q_6$ is off, the first transistor $Q_1$ and the fourth transistor $Q_4$ turn off simultaneously while the second transistor $Q_2$ and the third transistor $Q_3$ turn on simultaneously. When the first switch element $Q_5$ is off and the second switch element $Q_6$ is on, the first transistor $Q_1$ and the fourth transistor $Q_4$ turn on simultaneously while the second transistor $Q_2$ and the third transistor $Q_3$ turn off simultaneously. Using the alternate switching of the full-bridge circuit 121, the current flowing through the coil L of the stator magnetic pole 11 changes its direction and generates the polarity change so that the fan system 1 operates. The driving signal $S_d$ may be a pulse width modulation (PWM) signal. In addition, when the fan system 1 operates, the energy storage $C_1$ of the real-time stopping unit 13 may be charged simultaneously.

When an external power supply P of the fan system 1, which supplies a power of 12 volts, is powered off or the electricity power is off, the driving signal $S_d$ cannot be sent into the first switch element $Q_5$ and the second switch element $Q_6$ such that the first switch element $Q_5$ and the second switch element $Q_6$ turn off simultaneously. At this time, the energy storage $C_1$ of the real-time stopping unit 13 is initially discharged and the control signal $S_c$ is generated. The control signal $S_c$ forces to turn on the lower bridge element (i.e., the first transistor $Q_1$ and the second transistor $Q_2$) of the full-bridge circuit 121 to enable two ends of the coil L of the stator magnetic pole 11 to have the same voltage level so that the fan system 1 stops operating immediately.

As shown in FIG. 2, the fan system 1' operates as follows when the driving unit 12 includes the half-bridge circuit 122. The driving unit 12 controls the first switch element $Q_5$ and the second switch element $Q_6$ of the real-time stopping unit 13 to turn on or off in accordance with the driving signal $S_d$ supplied from the outside. The driving signal $S_d$ includes two driving signals having two opposite phases. Thus, each of the first switch element $Q_5$ and the second switch element $Q_6$ generates a control signal $S_c$ to control switching of the first transistor $Q_1$ and the second transistor $Q_2$. When the first switch element $Q_5$ is on and the second switch element $Q_6$ is off, the control signal $S_c$ controls the first transistor $Q_1$ to turn off and the second transistor $Q_2$ to turn on. When the first switch element $Q_5$ is off and the second switch element $Q_6$ is on, the first transistor $Q_1$ turns on and the second transistor $Q_2$ turns off in accordance with the control signal $S_c$. Utilizing the switching of the half-bridge circuit 122, the current flowing through the first coil $L_1$ and the second coil $L_2$ of the stator magnetic pole 11 changes its direction so that the polarity change is changed to make the fan system 1' operate while charging the energy storage $C_1$ of the real-time stopping unit 13.

When the external power supply P of the fan system 1' is powered off or the electricity power is off, the driving signal $S_d$ cannot be sent into the first switch element $Q_5$ and the second switch element $Q_6$ so that the first switch element $Q_5$ and the second switch element $Q_6$ turn off simultaneously. At this time, the energy storage $C_1$ starts to discharge and generates the control signal $S_c$, which turns on the first transistor $Q_1$ and the second transistor $Q_2$ simultaneously. The fan system 1' stops operating immediately because the first coil $L_1$ and the second coil $L_2$ have the same magnetic pole.

Discharging the energy storage $C_1$ to generate the control signal $S_c$ can turn on the first transistor $Q_1$ and the second transistor $Q_2$ of the full-bridge circuit 121 or the half-bridge circuit 122 simultaneously to stop the fan system 1 or 1' immediately. Therefore, the energy storage $C_1$ may be a capacitor having a small capacitance.

The invention also provides a real-time stopping device of a fan system. The fan system 1 has a stator magnetic pole 11 and a driving unit 12 coupled with the stator magnetic pole 11. The driving unit 12 controls a polarity change of the stator magnetic pole 11 in accordance with a driving signal $S_d$. The real-time stopping device includes a real-time stopping unit 13 electrically connected with the driving unit 12. When the fan system 1 is powered off, the driving unit 12 enables two ends of the stator magnetic pole 11 to have the same voltage level in accordance with a control signal $S_c$ generated by real-time stopping unit 13 so that the fan system 1 stops operating immediately. The stator magnetic pole 11, the driving unit 12 and the real-time stopping unit 13 have been described hereinabove, so detailed descriptions thereof will be omitted.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan system, comprising:
a stator magnetic pole;
a driving unit coupled with the stator magnetic pole for controlling a polarity change of the stator magnetic pole in accordance with a driving signal; and
a real-time stopping unit directly electrically connected with the driving unit and having a first switch element, second switch element, an energy storage and a resistor, wherein the energy storage is electrically connected with the first switch element and the second switch element, the resistor is electrically connected with the energy storage so as to enable the energy storage to discharge rapidly;
when the fan system is powered off, the energy storage is initially discharged, and the driving unit enables two ends of the stator magnetic pole to have the same voltage level in accordance with a control signal generated by the real-time stopping unit so that the fan system stops operating immediately.

2. The fan system according to claim 1, wherein the driving unit comprises a bridge circuit, a full-bridge circuit or a half-bridge circuit.

3. The fan system according to claim 2, wherein the stator magnetic pole has a first coil and a second coil, the half-bridge circuit has a first transistor and a second transistor, the first transistor is electrically connected with the first coil, the second transistor is electrically connected with the second coil, and the control signal turns on the first transistor and the second transistor.

4. The fan system according to claim 3, wherein the first transistor and the second transistor are NMOS transistors, respectively.

5. The fan system according to claim 2, wherein the full-bridge circuit comprises a lower bridge element composed of a first transistor and a second transistor, and an upper bridge element composed of a third transistor and a fourth transistor, and the lower bridge element turns on simultaneously in accordance with the control signal.

6. The fan system according to claim 5, wherein the first transistor and the second transistor are NMOS transistors, and the third transistor and the fourth transistor are PMOS transistors.

7. The fan system according to claim 2, further comprising a first Zener diode and a second Zener diode, wherein the first Zener diode and the second Zener diode are connected with the stator magnetic pole and the bridge circuit.

8. The fan system according to claim 1, wherein the driving signal is a pulse width modulation (PWM) signal.

9. The fan system according to claim 1, wherein the first switch element and the second switch element are transistors or NMOS transistors.

10. The fan system according to claim 1, wherein the energy storage is a capacitor or a capacitor having a small capacitance.

11. The fan system according to claim 1, wherein when the fan system is powered off, the first switch element and the second switch element turn off simultaneously, and the energy storage generates the control signal to enable the two ends of the stator magnetic pole to have the same voltage level so that the fan system stops operating immediately.

12. The fan system according to claim 1, further comprising a first diode and a second diode, wherein one end of the first diode is electrically connected with the second diode, and another end of the first diode is electrically connected with the real-time stopping unit.

13. The fan system according to claim 1, wherein the fan system is an axial-flow fan system or a centrifugal fan system.

14. A real-time stopping device of a fan system, the fan system having a stator magnetic pole and a driving unit, wherein the driving unit is coupled with the stator magnetic pole and controls a polarity change of the stator magnetic pole in accordance with a driving signal, the real-time stopping device comprising a real-time stopping unit directly electrically connected with the driving unit, wherein the real-time stopping unit has a first switch element, second switch element, an energy storage and a resistor, the energy storage is electrically connected with the first switch element and the second switch element, the resistor is electrically connected with the energy storage so as to enable the energy storage to discharge rapidly and when the fan system is powered off, the energy storage is initially discharged, and when the fan system is powered off, the energy storage is initially discharged, and the driving unit enables two ends of the stator magnetic pole to have the same voltage level in accordance with a control signal generated by the real-time stopping unit so that the fan system stops operating immediately.

15. The device according to claim 14, wherein the first switch element and the second switch element are transistors or NMOS transistors.

16. The device according to claim 14, wherein the real-time stopping unit further comprises a resistor electrically connected with the energy storage, and the energy storage is a capacitor or a capacitor having a small capacitance.

17. A fan system, comprising:
a stator magnetic pole;
a driving unit coupled with the stator magnetic pole for controlling a polarity change of the stator magnetic pole in accordance with a driving signal; and
a real-time stopping unit comprising an energy storage and electrically connected with the driving unit and having a first switch element, second switch element, an energy storage and a resistor, wherein the energy storage is electrically connected with the first switch element and the second switch element, the resistor is electrically connected with the energy storage so as to enable the energy storage to discharge rapidly;
when the fan system is powered off, the energy storage is initially discharged, and the driving unit enables two ends of the stator magnetic pole to have the same voltage level in accordance with a control signal generated by the energy storage of the real-time stopping unit so that the fan system stops operating immediately.

* * * * *